United States Patent
Wurthner et al.

(10) Patent No.: US 8,386,123 B2
(45) Date of Patent: Feb. 26, 2013

(54) METHOD FOR CALIBRATING A SLOPE SENSOR

(75) Inventors: Maik Wurthner, Markdorf (DE);
Joachim Staudinger, Ravensburg (DE);
Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/321,335

(22) PCT Filed: Mar. 12, 2010

(86) PCT No.: PCT/EP2010/053161
§ 371 (c)(1),
(2), (4) Date: Nov. 18, 2011

(87) PCT Pub. No.: WO2010/139493
PCT Pub. Date: Dec. 9, 2010

(65) Prior Publication Data
US 2012/0065835 A1  Mar. 15, 2012

(30) Foreign Application Priority Data
Jun. 3, 2009  (DE) .......................... 10 2009 026 688

(51) Int. Cl.
*G06F 7/00*  (2006.01)
(52) U.S. Cl. ..................................................... 701/33.1
(58) Field of Classification Search ................. 701/29.1,
701/29.7, 30.3, 30.5, 30.8, 30.9, 31.1, 33.1,
701/33.3, 33.4, 33.7, 33.9
See application file for complete search history.

(56) References Cited

U.S. PATENT DOCUMENTS

| 5,187,977 | A | 2/1993 | Koschorek et al. |
| 5,446,658 | A | 8/1995 | Pastor et al. |
| 5,797,109 | A | 8/1998 | Aminpour et al. |
| 6,964,188 | B2 | 11/2005 | Streit et al. |
| 2001/0020900 | A1* | 9/2001 | Froeschl et al. ............... 340/671 |
| 2004/0099044 | A1* | 5/2004 | Streit et al. ..................... 73/1.38 |

FOREIGN PATENT DOCUMENTS

| DE | 36 34 244 A1 | 4/1988 |
| DE | 40 25 184 A1 | 2/1992 |
| DE | 43 08 128 C1 | 6/1994 |
| DE | 197 52 439 A1 | 6/1999 |
| DE | 198 38 970 A1 | 3/2000 |
| DE | 102 54 296 A1 | 6/2004 |
| DE | 103 14 998 A1 | 6/2004 |
| DE | 103 03 590 A1 | 9/2004 |
| EP | 0 451 446 A1 | 10/1991 |
| EP | 0 716 000 A2 | 6/1996 |
| EP | 1 930 690 A1 | 6/2008 |

* cited by examiner

*Primary Examiner* — Kim T Nguyen
(74) *Attorney, Agent, or Firm* — Davis & Bujold, PLLC

(57) ABSTRACT

A method for automatically determining a current offset value for the zero-point correction of a vehicle inclination sensor including the steps of while driving in a first driving direction, the current driving resistance is determined repeatedly, without regard to the sensor and stored temporarily, and a current raw signal value of the sensor is noted. Upon a change in the driving direction, the last-noted raw signal value is stored temporarily and while driving in the second driving direction. The current driving resistance is determined repeatedly, without regard to the sensor and stored temporarily. Then, if the difference between the two stored driving resistances agree with a tolerance threshold, the noted raw signal value is stored as the offset value for the zero-point correction of the inclination sensor.

20 Claims, 2 Drawing Sheets

METHOD FOR CALIBRATING A SLOPE SENSOR

This application is a National Stage completion of PCT/EP2010/053161 filed Mar. 12, 2010, which claims priority from German patent application serial no. 10 2009 026 688.7 filed Jun. 3, 2009.

FIELD OF THE INVENTION

The invention concerns a method for calibrating a slope sensor which is arranged in a motor vehicle with a semi-automatic transmission for determining the inclination of the road and the inclination-related resistance, and is connected for signal transmission purposes to the transmission control unit of the transmission.

BACKGROUND OF THE INVENTION

For controlling the gear ratio change processes in a semi-automatic transmission, besides the driving speed $v\_F$ of the motor vehicle, the engine rotational speed of the drive engine and the power demanded by the driver, the driving resistance $F\_Fw$ is an essential input parameter. In a moving motor vehicle in each case the shifting speed and the target speed of the next gearshift, i.e. the timing and the target gear of the gearshift, and when the motor vehicle is at rest the respective starting gear, are determined as a function of the driving resistance at the time.

When the drive-train is closed and the service brake is not actuated, in a known manner the driving resistance $F\_Fw$ can be determined from the traction or thrust force provided by the drive motor $F\_Rad$ that acts on the drive wheels and the acceleration resistance $F\_B = m\_Fzg * a\_F$ calculated as the product of the vehicle's mass $m\_Fzg$ and the driving acceleration $a\_F$ of the motor vehicle, from the formula $F\_Fw = F\_Rad - F\_B$. The traction or thrust force $F\_Rad$ acting on the drive wheels can for example be calculated from the engine torque of the drive engine, which can be read out of the engine control unit or the CAN databus, or from the torque acting at the output shaft of the transmission, which can be determined by a torque sensor, taking into account the gear ratio at the time and the transmission efficiency in the drive-train. The driving acceleration $a\_F$ can be determined by differentiating the driving speed $v\_F$ of the motor vehicle, detected by wheel rotational speed sensors, or it can be read out of the CAN databus.

However, when the drive-train is at least partially open, as when maneuvering with a slipping starting clutch, and/or when the service brakes are actuated by a the driver or by a control unit that acts on a service brake actuator, the driving resistance $F\_Fw$ can only be determined with sufficient accuracy as the sum of its components ($F\_Fw = F\_Luft + F\_Roll + F\_Steig$), i.e. the air resistance $F\_Luft$, the rolling resistance $F\_Roll$ and the inclination-related resistance $F\_Steig$. In such a case the inclination-related resistance $F\_Steig$ is obtained as the product of the vehicle's mass $m\_Fzg$, the acceleration g due to gravity, and the value of the road inclination $\alpha\_Fb$, in accordance with the equation $F\_Steig = m\_Fzg * g * \sin(\alpha\_Fb)$.

However, besides controlling gearshifts in a semi-automatic transmission, other control functions as well can be carried out as functions of the road inclination. For example, DE 198 38 970 A1 describes a method for starting on a hill for a motor vehicle with an electronic torque control system, in which backward rolling of the motor vehicle during a starting process is prevented in that the torque demand, which depends on the position of the accelerator pedal, is increased by an offset value which is determined proportionally to the road inclination and the mass of the vehicle.

In a method for controlling a rolling lock of a motor vehicle with an electronic brake control system assisted by an external force according to DE 103 03 590 A1, it is provided that when the vehicle is at rest, without actuating the brake pedal, a rolling lock pressure in the wheel brakes is regulated, which is determined proportionally to the road inclination and a further magnitude derived from the mass of the vehicle.

To determine the road inclination it is usual for an inclination sensor that detects the longitudinal inclination of the vehicle to be arranged in the motor vehicle, which is in most cases integrated in the transmission control unit of the transmission. Such an inclination sensor can be designed in accordance with various working principles. For example, from DE 36 34 244 A1 an optical-electronic inclination sensor is known, in which a light-refracting or light-reflecting liquid in a container is arranged in the ray path between a radiation emitter and a radiation detector. DE 40 25 184 C2 describes a capacitative inclination sensor in which an electrically conductive liquid in a container is arranged between the electrodes of a condenser, which are provided with an insulating layer. Finally, from DE 197 52 439 C2 a micro-mechanical inclination sensor is known, in which a mass plate is connected, via at least two pressure sensor units, to a carrier plate which also contains the electronic evaluation unit for determining the inclination.

Since in an arrangement integrated in the transmission control unit the inclination sensor is in fixed connection with the transmission, the orientation of the inclination sensor corresponds to the position in which the transmission has been fitted, which is not always horizontal but can easily be tilted a few degrees away from the horizontal. In such a case, without a zero-point correction the inclination sensor will indicate an upward or downward gradient of the road even though the motor vehicle concerned is actually on level ground. Furthermore, inclination sensors are subject to aging effects which can also lead to indication of an upward or downward road inclination even though the vehicle concerned is on level ground. It is therefore necessary, when the motor vehicle is first used, i.e. after its production, and when it is first re-used, for example after a repair job or replacement of the transmission in a workshop, and even during driving operation of the motor vehicle and the transmission, to calibrate the inclination sensor by determining a current offset value $x\_Offset$ for the zero-point correction of the inclination sensor, by means of which the sensor signal $x\_Nsn$ of the inclination sensor can then be corrected in relation to the horizontal position of the vehicle ($\alpha\_Fb = f(x\_Nsn - x\_Offset)$).

In principle, such calibration can be initiated manually by a driver if, when driving on a level, i.e. horizontal road he actuates an operating element, such as a particular function key or the selector lever, in a prescribed manner. Whereas, when the motor vehicle is first used or first re-used, this should be possible without problems for a trained technician driving along a level test stretch, if the calibration function is manually initiated by a driver driving during normal driving operation there is a risk that a slight upward or downward road inclination will be erroneously perceived by the driver as horizontal, or that in the act of initiating and monitoring the calibration function the driver will be distracted in a safety-relevant manner from watching the traffic situation, or that initiation of the calibration function at the appropriate time will be forgotten by the driver and will therefore be omitted.

SUMMARY OF THE INVENTION

Against this background the purpose of the present invention is to propose a method for the automatic calibration of an inclination sensor of the type described at the start.

this objective is achieved in that under certain operating conditions a current offset value x_Offset for the zero-point correction of the inclination sensor is determined automatically, the procedure being that when the motor vehicle starts being driven, while it is driving in a first driving direction the current driving resistance F_Fw1 is determined repeatedly and without regard to the inclination sensor and is stored temporarily and a current raw signal value x_Ns0 of the inclination sensor is noted, until a change of driving direction is recognized, then the last-noted raw signal value x_Ns0 of the inclination sensor is first stored temporarily and thereafter, while driving in a second, opposite driving direction the current driving resistance F_Fw2 is again determined repeatedly and without regard to the inclination sensor and is stored temporarily, and the driving resistance F_Fw1 determined for the first driving direction is compared with the driving resistance F_Fw2 determined for the second, opposite driving direction, and if the two driving resistances F_Fw1, F_Fw2 are in agreement to within a specified tolerance threshold $\Delta F\_Ts$; ($|F\_Fw1-F\_Fw2| \leq \Delta F\_Ts$) the noted raw signal value x_Ns0 of the inclination sensor is stored permanently as the offset value x_Offset for the zero-point correction of the inclination sensor (x_Offset=x_Ns0).

Thus, the method according to the invention starts with a motor vehicle, for example a utility vehicle, which has a semi-automatic transmission whose transmission control unit is equipped with or at least connected for signal exchange purposes to an inclination sensor for detecting the longitudinal inclination of the vehicle and thus for determining the road inclination $\alpha\_Fb$ and the inclination-related resistance F_Steig.

The invention is based on the recognition that the motor vehicle is on a level, i.e. horizontal road if a driving resistance F_Fw1 determined before a change of the driving direction and a driving resistance F_Fw2 determined after the driving direction change are substantially in agreement. Accordingly, the raw signal x_Ns0 of the inclination sensor noted immediately before the driving direction change is then the zero-point offset x_Offset (x_Offset=x_Ns0) for the inclination sensor signal which can subsequently be used for zero-point correction of the inclination sensor, i.e. for the offset correction of the sensor signal x_Nsn of the inclination sensor ($\alpha\_Fb=f(x\_Nsn-x\_Offset)$).

The driving resistance F_Fw1, F_Fw2 is determined without regard to the inclination sensor, preferably in such manner that in each case it is determined from the traction or thrust force F_Rad acting on the drive wheels and the acceleration resistance F_B determined from the vehicle's mass m_Fzg and its driving acceleration a_F, in accordance with the equation F_Fw=F_Rad–F_B or F_Fw=F_Rad–m_Fzg*a_F.

To avoid determining an erroneous or inaccurate offset value x_Offset of the inclination sensor, it is provided that in each case the driving resistance F_Fw1, F_Fw2 determined undergoes a plausibility check and that only a plausible driving resistance value F_Fw1, F_Fw2 is stored and used for determining the offset value x_Offset of the inclination sensor.

For this plausibility check it can for example be checked whether the driving resistance F_Fw1, F_Fw2 determined lies within an expected range defined by appropriate limit values F_Fw_min, F_Fw_max ($F\_Fw\_min \leq F\_Fw \leq F\_Fw\_max$).

To exclude the possibility that the motor vehicle is just at that time in a dip or on a hump, when although the two driving resistances F_Fw1 and F_Fw2 are equal in the two driving directions, they have a positive or negative inclination component, in the plausibility check the gradient of the driving resistance d/dt F_Fw1, d/dt F_Fw2 can additionally be determined and it can be checked whether the respective driving resistance gradient d/dt F_Fw1, d/dt F_Fw2 is close to zero for an appropriate observation period and to within an appropriate tolerance threshold.

Alternatively, in the plausibility check it can also be checked whether the difference between the currently determined driving resistance value F_Fw1, F_Fw2 and the driving resistance value F_Fw1, F_Fw2 last determined in the same driving direction lies in each case within an appropriate tolerance threshold close to zero.

As regards the driving resistance values F_Fw1, F_Fw2 to be compared, it can be provided that the driving resistance value F_Fw1 last determined in the first driving direction is compared with the driving resistance value F_Fw2 first determined in the second driving direction.

However, to increase the accuracy of the driving resistances F_Fw1, F_Fw2 determined for the two driving directions, it can also be provided that the driving resistance F_Fw1, F_Fw2 in each respective driving direction, used for the comparison, is in each case determined as the average of an appropriate number of several successively determined driving resistance values F_Fw1, F_Fw2.

In doing this, to avoid the influence of interfering signals for example attributable to unevenness of the road, the driving resistance values F_Fw1, F_Fw2 determined successively in each driving direction are expediently smoothed by means of a suitable filter function.

To increase accuracy still more, the permanently stored offset value x_Offset of the inclination sensor can also be determined as the average of the offset values x_Offset calculated after an appropriate number of several successive driving direction changes.

Since the driving resistance F_Fw1, F_Fw2 can only be determined from the equation F_Fw=F_Rad–F_B if the drive-train is closed and when there are no additional driving resistance forces, monitoring functions are indicated below which, in case of need, lead to an interruption or discontinuation of the determination of the driving resistance F_Fw1, F_Fw2.

Since driving round a curve increases the rolling resistance F_Roll, for example due to abrasion of the wheel tires, it is expedient to detect the steering angle of the vehicle's steering system and/or the transverse acceleration of the motor vehicle, and to interrupt the determination of the driving resistance F_Fw1, F_Fw2 and that of a current offset value x_Offset of the inclination sensor for the duration $\Delta t\_U$ of a recognized drive round a curve.

Likewise, owing to road unevenness and a loose subsurface, off-road driving also increases the rolling resistance F_Roll. Accordingly, it is preferably provided that unevenness of the road and/or transverse tilting of the motor vehicle and/or the engagement of an off-road gear in the transmission are detected, and the determination of the driving resistance F_Fw1, F_Fw2 and of a current offset value x_Offset of the inclination sensor are interrupted for the duration $\Delta t\_U$ of recognized off-road driving.

To allow for an open drive-train, the shift status of the transmission can be detected and the determination of the driving resistance F_Fw1, F_Fw2 and of a current offset value x_Offset of the inclination sensor are interrupted for the duration $\Delta t\_U$ of a recognized gearshift.

For this, it can also be provided that the degree to which a starting clutch that connects the drive engine to the transmission is open is detected, and the determination of the driving resistance F_Fw1, F_Fw2 and of a current offset value x_Offset of the inclination sensor are interrupted for the duration Δt_U of an at least partially open starting clutch.

To allow for any additional braking force, it is provided that the actuation status of the service brakes is detected and the determination of the driving resistance F_Fw1, F_Fw2 and of a current offset value x_Offset of the inclination sensor are interrupted for the duration Δt_U of a recognized actuation of the service brakes.

Since a driving direction change required for the method according to the invention can of course only take place or be imminent when the driving speed v_F is low, whereas at a higher driving speed the air resistance F_Luft would have to be taken into account, it can additionally be provided that the current driving speed v_F is noted and the determination of the driving resistance F_Fw1, F_Fw2 and of a current offset value x_Offset of the inclination sensor are interrupted for the duration Δt_U of a driving speed v_F which is above an appropriate speed limit v_Gr (v_F>v_Gr).

Alternatively or as a supplement thereto, the driving gear G_F currently engaged can be noted and the determination of the driving resistance F_Fw1, F_Fw2 and of a current offset value x_Offset of the inclination sensor are interrupted for the duration Δt_U of a driving gear G_F higher than an appropriate limit gear G_Gr (G_F>G_Gr).

To allow for a pause in operation, it can be provided that the operating status of the motor vehicle is noted and the determination of the driving resistance F_Fw1, F_Fw2 and of a current offset value x_Offset of the inclination sensor are interrupted for the duration Δt_U of a recognized pause in operation.

The reaction to the length of the interruption duration Δt_U can be that the determination of the driving resistance F_Fw1, F_Fw2 and of a current offset value x_Offset of the inclination sensor is continued if the interruption duration Δt_U is less than an appropriate duration limit Δt_Gr (Δt_U<Δt_Gr), but discontinued if the interruption duration Δt_U reaches or exceeds the duration limit Δt_Gr (Δt_U≧Δt_Gr). For this, the respective duration limit Δt_Gr can optionally be defined as the same in all cases, or of differing length depending on the respective reason for the interruption.

To allow for loading and unloading processes, which bring about a change of the vehicle's mass m_Fzg and consequently of the rolling resistance F_Roll and the acceleration resistance F_B, it is also provided that the vehicle's mass m_Fzg or the laden mass m_Ldg is determined, and the determination of the driving resistance F_Fw1, F_Fw2 and of a current offset value x_Offset of the inclination sensor are interrupted if the change Δm of the vehicle's mass m_Fzg or laden mass m_Ldg is numerically greater than an appropriate mass difference limit Δm_Gr>0 (|Δm|>Δm_Gr).

BRIEF DESCRIPTION OF THE DRAWINGS

To clarify the invention the description of a drawing with an example embodiment is attached. The drawing shows.

DETAILED DESCRIPTION OF THE PREFERRED EMBODIMENTS

Figure 2:
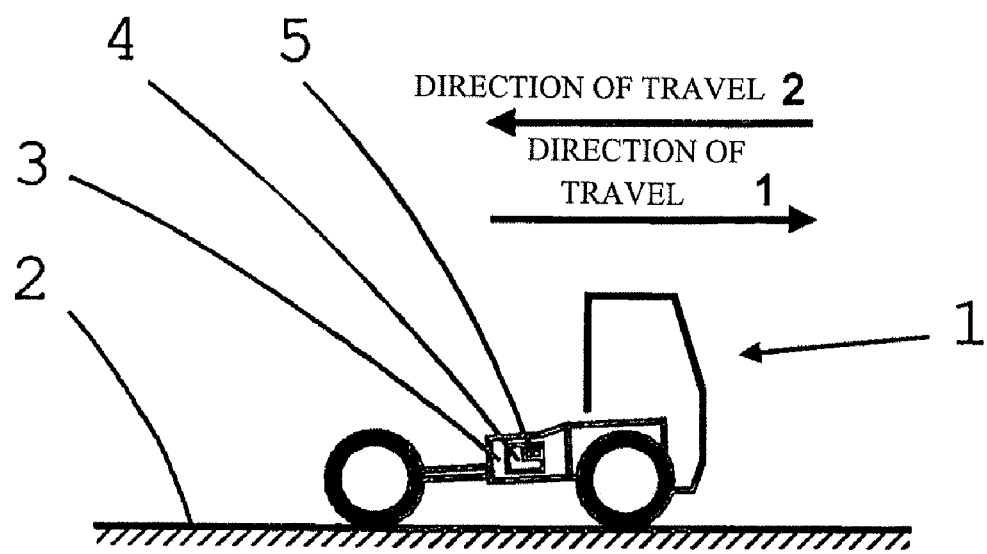
FIG. 2: A sketch to explain the operating situation of a motor vehicle for carrying out the method according to the invention.

In FIG. 2 a schematically represented motor vehicle 1, in this case a truck, is on a level, i.e. horizontal road 2. The drive-train of the motor vehicle 1 contains a semi-automatic transmission 3 with a transmission control unit 4, in or on which is arranged an inclination sensor 5 for determining the road inclination α_Fb and the inclination-related resistance F_Steig.

In the method described below a driving direction change, i.e. a change from driving in a first direction, for example forward, to driving in a second direction, for example reversing, is used for recognizing a level or horizontal road 2 and in such a case storing the detected raw signal value x_Ns0 of the inclination sensor 5 as the current offset value x_Offset for the zero-point correction of the inclination sensor 5.

Figure 1:
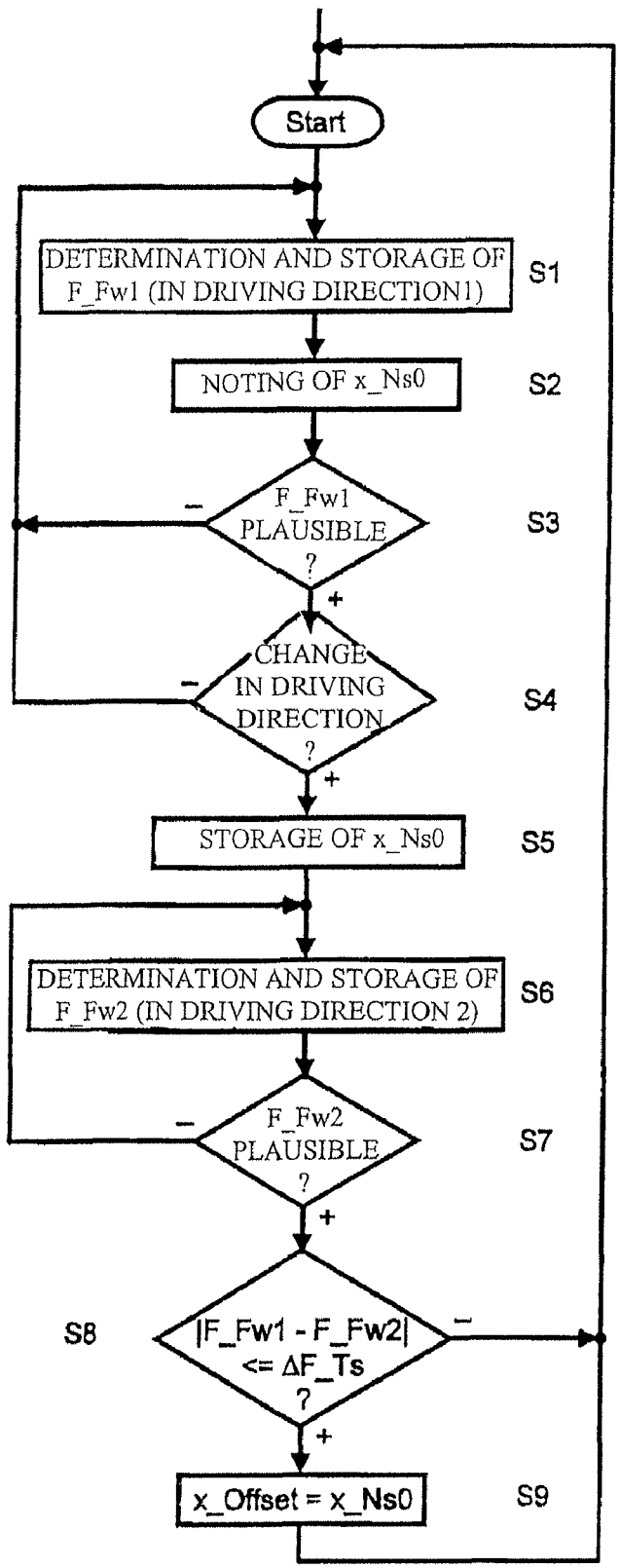
FIG. 1: A flow-chart of the method according to the invention for determining an offset value for the zero-point correction of an inclination sensor.

The method, represented in simplified form in the flow-chart of FIG. 1, starts when the motor vehicle 1 begins operating and drives in a first direction, for example forward. In process step S1 the driving resistance F_Fw1 in this first driving direction is determined without regard to the inclination sensor and stored temporarily, i.e. in a volatile memory. For this, the momentary traction or thrust torque F_Rad of the drive engine acting on the drive wheels of the motor vehicle 1, the current vehicle mass m_Fzg and the current driving acceleration a_F are determined, and the driving resistance is calculated from the equation F_Fw1=F_Rad−m_Fzg*a_F.

At approximately the same time, in process step S2 the current raw signal value x_Ns0 of the inclination sensor 5 is noted.

Then, in process step S3 a plausibility check of the driving resistance F_Fw1 determined is carried out, i.e. for example it is checked whether the driving resistance F_Fw1 determined lies within an expected range defined by appropriate limit values F_Fw_min, F_Fw_max (F_Fw_min≦F_Fw1≦F_Fw_max). If the driving resistance F_Fw1 is not plausible, that value is no longer used, i.e. it is deleted and the process branches back to before process step S1 and then determines a new driving resistance value F_Fw1.

If the driving resistance F_Fw1 is plausible, in process step S4 it is checked whether there has been a driving direction change. For this, for example a change of the selector lever position from D to R (or vice versa) or a change of the gear engaged in the transmission 3 from a forward gear to a reverse gear (or vice versa) can be detected. If there is no driving direction change, the process branches back to before process step S1 and then a new driving resistance value F_Fw1 is determined.

However, if a driving direction change has been recognized the previously noted raw signal value x_Ns0 of the inclination sensor 5 is temporarily stored in a volatile memory in accordance with a process step S5.

Then, in process step S6 the driving resistance F_Fw2 in the opposite, second driving direction is determined without regard to the inclination sensor and is temporarily stored in a volatile memory. For this, again the momentary drive engine traction or thrust torque F_Rad acting on the drive wheels of the motor vehicle 1, the current vehicle mass m_Fzg and the current driving acceleration a_F are determined and the driving resistance is calculated from the equation F_Fw2=F_Rad−m_Fzg*a_F.

Then, in process step S7 a plausibility check of the driving resistance F_Fw2 is carried out. If this driving resistance F_Fw2 is not plausible, that value is no longer used, i.e. it is deleted and the process branches back to before process step S6, after which a new driving resistance value F_Fw2 is determined.

If the driving resistance value F_Fw2 is plausible, then in process step S8 it is checked whether the difference between the two driving resistances F_Fw1, F_Fw2 agree to within a specified tolerance range ΔF_Ts (|F_Fw1−F_Fw2|≦ΔF_Ts), which means that the motor vehicle 1 is on a level, i.e. horizontal road 2. If the two driving resistances F_Fw1, F_Fw2 are not in agreement, i.e. the motor vehicle 1 is not on a level road 2, the current process cycle is discontinued and a new process cycle is started.

But if the two driving resistances F_Fw1, F_Fw2 are in agreement, i.e. if the motor vehicle 1 is on a level road 2, the last-received raw signal value x_Ns0 of the inclination sensor 5 is stably stored in a non-volatile memory as the current offset value x_Offset of the inclination sensor 5 (x_Offset=x_Ns0) and is then used for the zero-point correction of the inclination sensor 5. Thereafter, a new process cycle for determining a new offset value x_Offset of the inclination sensor 5 is started.

INDEXES

1 Motor vehicle
2 Road
3 Semi-automatic transmission
4 Transmission control unit
5 Inclination sensor
a_F Driving acceleration
F_B Acceleration resistance
F_Fw Driving resistance
F_Fw_max Maximum driving resistance
F_Fw_min Minimum driving resistance
F_Fw1 Driving resistance in the first driving direction
F_Fw2 Driving resistance in the second driving direction
F_Luft Air resistance
F_Rad Traction force, thrust force
F_Roll Rolling resistance
F_Steig Inclination-related resistance
g Acceleration due to gravity
G_F Driving gear
G_Gr Limit gear
m_Fzg Vehicle mass
m_Ldg Laden mass
S1-S9 Process steps
v_F Driving speed
v_Gr Speed limit
x_Ns0 Raw signal value
x_Nsn Sensor signal
x_Offset Offset value
α_Fb Road inclination
Δm Mass change
Δm_Gr Mass change limit
Δt_Gr Duration limit
Δt_U Duration of interruption

The invention claimed is:

1. A method of calibrating an inclination sensor, which is arranged in a motor vehicle (1) with a semi-automatic transmission (3) for determining road inclination (α_Fb) and inclination-related resistance (F_Steig) and being connected for signal transmission purposes with a transmission control unit (4) of the transmission (3) such that, under certain operating conditions of the motor vehicle, a current offset value (x_Offset) for the zero-point correction of the inclination sensor (5) is determined automatically, the method comprising the steps of:

once operation of the motor vehicle (1) begins, repeatedly determining and temporarily storing, while the motor vehicle is driving in a first driving direction, a current first driving resistance (F_Fw1) without regard to the inclination sensor (5) and noting a current raw signal value (x_Ns0) of the inclination sensor (5);

recognizing a change of driving direction from the first driving direction to a second driving direction;

temporarily storing the raw signal value (x_Ns0) of the inclination sensor (5) that was last determined;

repeatedly determining and temporarily storing, while the motor vehicle is driving in an opposite, second driving direction, a current second driving resistance (F_Fw2) without regard to the inclination sensor;

comparing the first driving resistance (F_Fw1) determined for driving in the first driving direction with the second driving resistance (F_Fw2) determined for driving in the second driving direction; and if the first and the second driving resistances (F_Fw1, F_Fw2) are in agreement with a specified tolerance threshold (ΔF_Ts), permanently storing the stored raw signal value (x_Ns0) of the inclination sensor as the offset value (x_Offset) for the zero-point correction of the inclination sensor (x_Offset=x_Ns0).

2. The method according to claim 1, further comprising the step of determining each of the first and the second driving resistances (F_Fw1, F_Fw2) from either a traction or a thrust force (F_Rad) of a drive engine acting on drive wheels and from an acceleration resistance (F_B) calculated from a mass (m_Fzg) of the motor vehicle and driving acceleration (a_F) (F_B=m_Fzg*a_F) in accordance with an equation (F_Fw=F_Rad−F_B).

3. The method according to claim 1, further comprising the step of subjecting each of the first and the second driving resistances (F_Fw1, F_Fw2) to a plausibility check, and only storing and using plausible first and second driving resistances (F_Fw1, F_Fw2) for determining the offset value (x_Offset) of the inclination sensor (5).

4. The method according to claim 3, further comprising the step of, if the first and the second driving resistances (F_Fw1, F_Fw2) are within an expected range defined by appropriate limit values (F_Fw_min, F_Fw_max), recognizing that the first and the second driving resistances (F_Fw1, F_Fw2) determined are plausible.

5. The method according to claim 3, further comprising the step of checking the plausibility of the first and the second driving resistances (F_Fw1, F_Fw2) by determining a respective gradient of the first and the second driving resistances (d/dt F_Fw1, d/dt F_Fw2), and checking whether the respective driving resistance gradient (d/dt F_Fw1, d/dt F_Fw2) lies within an appropriate tolerance threshold during an appropriate observation period.

6. The method according to claim 3, further comprising the step of checking the plausibility by checking whether a difference between the respective currently determined driving resistance value (F_Fw1, F_Fw2) and the respective driving resistance value (F_Fw1, F_Fw2), last determined in the same driving direction, lies within an appropriate tolerance threshold close to zero.

7. The method according to claim 1, further comprising the step of comparing a last value of the first driving resistance (F_Fw1) determined in the first driving direction with a first value of the second driving resistance (F_Fw2) determined in the second driving direction.

8. The method according to claim 7, further comprising the step of smoothing with a suitable filter function the first and the second driving resistance values (F_Fw1, F_Fw2) determined successively in each driving direction.

9. The method according to claim 1, further comprising the step of determining the first and the second driving resistances (F_Fw1, F_Fw2) by averaging a plurality of several successively determined first and second driving resistance values (F_Fw1, F_Fw2).

10. The method according to claim 1, further comprising the step of determining the permanently stored offset value (x_Offset) of the inclination sensor as an average of a plurality of offset values (x_Offset) determined after successive driving direction changes.

11. The method according to claim 1, further comprising the step of determining at least one of a steering angle of the steering system of the vehicle and a transverse acceleration of the vehicle, and interrupting the determination of the first and the second driving resistances (F_Fw1, F_Fw2) and of a current offset value (x_Offset) of the inclination sensor (5) for a duration ($\Delta t\_U$) of recognized while driving round a curve.

12. The method according to claim 11, further comprising the step of continuing the determination of the first and the second driving resistance (F_Fw1, F_Fw2) and the current offset value (x_Offset) of the inclination sensor (5) after the interruption, if the duration ($\Delta t\_U$) of the interruption is less than a duration limit ($\Delta t\_Gr$) ($\Delta t\_U < \Delta t\_Gr$), and discontinuing if the duration ($\Delta t\_U$) of the interruption either reaches or exceeds the duration limit ($\Delta t\_Gr$) ($\Delta t\_U \geq \Delta t\_Gr$).

13. The method according to claim 1, further comprising the step of detecting at least one of unevenness of a road, a transverse inclination of the motor vehicle and an engagement of an off-road gear in the transmission, and interrupting the determination of the first and the second driving resistances (F_Fw1, F_Fw2) and of the current offset value (x_Offset) of the inclination sensor (5) for a duration ($\Delta t\_U$) of recognized off-road driving.

14. The method according to claim 1, further comprising the step of detecting a shift status of the transmission (3), and interrupting the determination of the first and the second driving resistance (F_Fw1, F_Fw2) and the current offset value (x_Offset) of the inclination sensor (5) for a duration ($\Delta t\_U$) of a recognized gearshift.

15. The method according to claim 1, further comprising the step of detecting a degree to which a starting clutch, that connects a drive engine to the transmission (3), is open, and interrupting the determination of the first and the second driving resistance (F_Fw1, F_Fw2) and of the current offset value (x_Offset) of the inclination sensor (5) for a duration ($\Delta t\_U$) of an at least partially disengaged starting clutch.

16. The method according to claim 1, further comprising the step of detecting an actuation status of service brakes, and interrupting the determination of the first and the second driving resistance (F_Fw1, F_Fw2) and the current offset value (x_Offset) of the inclination sensor (5) for a duration ($\Delta t\_U$) of recognized actuation of the service brakes.

17. The method according to claim 1, further comprising the step of determining a current driving speed (v_F), and interrupting the determination of the first and the second driving resistance (F_Fw1, F_Fw2) and the current offset value (x_Offset) of the inclination sensor (5) for a duration ($\Delta t\_U$) of a driving speed (v_F) which is above an appropriate speed limit (v_Gr) (v_F > v_Gr).

18. The method according to claim 1, further comprising the step of noting a gear (G_F) currently engaged, and interrupting the determination of the driving the first and the second resistance (F_Fw1, F_Fw2) and the current offset value (x_Offset) of the inclination sensor (5) for a duration ($\Delta t\_U$) during which a gear (G_F) that is higher than a limit gear (G_Gr) remains engaged (G_F > G_Gr).

19. The method according to claim 1, further comprising the step of noting an operating status of the motor vehicle, and interrupting the determination of the first and the second driving resistance (F_Fw1, F_Fw2) and the current offset value (x_Offset) of the inclination sensor (5) for a duration ($\Delta t\_U$) of a recognized pause in operation.

20. The method according to claim 1, further comprising the step of determining either a mass of the vehicle (m_Fzg) or a laden mass of the vehicle (m_Ldg) and discontinuing the determination of the first and the second driving resistance (F_Fw1, F_Fw2) and the current offset value (x_Offset) of the inclination sensor (5) if a numerical value of a change ($\Delta m$) of either the mass of the vehicle (m_Fzg) or the laden mass of the vehicle (m_Ldg) is greater than a mass difference limit ($\Delta m\_Gr > 0$) ($|\Delta m| > (\Delta m\_Gr)$).

\* \* \* \* \*